United States Patent
Al-Omari et al.

(10) Patent No.: US 7,743,053 B2
(45) Date of Patent: Jun. 22, 2010

(54) HYBRID DATABASE QUERY CACHING

(75) Inventors: Awny K. Al-Omari, Austin, TX (US);
Tom C. Reyes, Austin, TX (US); Robert Wehrmeister, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 412 days.

(21) Appl. No.: 11/581,942

(22) Filed: Oct. 17, 2006

(65) Prior Publication Data

US 2008/0091646 A1    Apr. 17, 2008

(51) Int. Cl.
G06F 7/00 (2006.01)
G06F 17/30 (2006.01)

(52) U.S. Cl. .................. 707/718; 707/721; 707/706
(58) Field of Classification Search .............. 707/2, 707/3, 4, 5, 999.002, 999.003, 999.004, 999.005
See application file for complete search history.

(56) References Cited

U.S. PATENT DOCUMENTS 6,466,931 B1 * 10/2002 Attaluri et al. ............ 707/2
2006/0031189 A1 * 2/2006 Muras et al. .............. 707/2
2006/0085375 A1 * 4/2006 Egan et al. ................ 707/1

\* cited by examiner

*Primary Examiner*—James Trujillo
*Assistant Examiner*—Bruce M Moser

(57) ABSTRACT

In one embodiment, a computer system comprises one or more processors, and a memory module communicatively connected to the one or more processors. The memory module comprises logic instructions stored on a computer readable medium which, when executed on the one or more processors configure the one or more processors to receive, in a hybrid caching module, database query, determine whether at least a portion of an existing execution plan stored in a memory module coupled to the hybrid caching module can be reused to implement the database query, reuse at least a portion of an existing execution plan stored in the memory module coupled to the hybrid caching module when possible, and generate a new execution plan when the memory module lacks an existing execution plan adaptable for use with the database query.

10 Claims, 4 Drawing Sheets

HYBRID DATABASE QUERY CACHING

BACKGROUND

Some database applications can generate hundreds or thousands of dynamic SQL statements for which the text and frequency of use are not known in advance. For example, order-takers in a supply chain application can use stock level queries more heavily than stock clerks adding new stock items on some days, but the reverse situation can also occur on other days. Preparing and holding hundreds or thousands of SQL statements in memory introduces problems of latency and over commitment whereby a database system may spend more time swapping unused SQL statements than running useful SQL queries. Failing to prepare SQL statements can be wasteful because it forces a database system to do many redundant computations (i.e., plan recompilations) for high usage queries. Asking SQL application developers to selectively prepare high usage queries may not be possible if the set of frequently used queries is not known in advance and can change rapidly.

DETAILED DESCRIPTION

Described herein are exemplary system and methods for hybrid database query caching which may be used in conjunction with a computer system. In embodiments, the methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Figure 1:
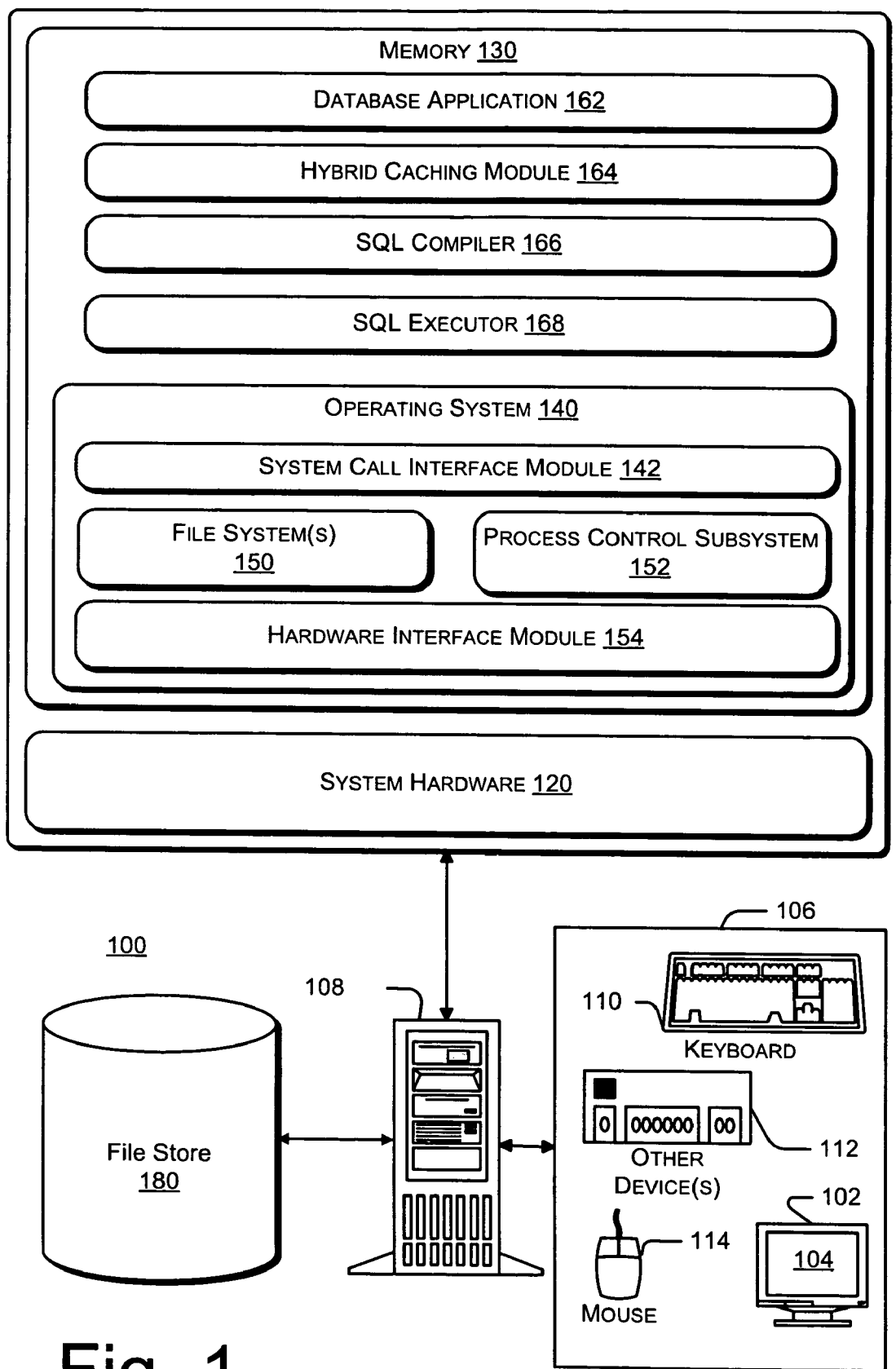
FIG. 1 is a schematic illustration of one embodiment of a computing system adapted to implement hybrid database query caching.

FIG. 1 is a schematic illustration of one embodiment of a computing system adapted to implement hybrid database query caching. The computer system 100 includes a computer 108 and one or more accompanying input/output devices 106 including a display 102 having a screen 104, a keyboard 110, other I/O device(s) 112, and a mouse 114. The other device(s) 112 can include a touch screen, a voice-activated input device, a track ball, and any other device that allows the system 100 to receive input from a developer and/or a user. The computer 108 includes system hardware 120 and random access memory and/or read-only memory 130. A file store 180 is communicatively connected to computer 108. File store 180 may be internal such as, e.g., one or more hard drives, or external such as, e.g., one or more external hard drives, network attached storage, or a separate storage network.

Memory 130 includes an operating system 140 for managing operations of computer 108. In one embodiment, operating system 140 includes a hardware interface module 154 that provides an interface to system hardware 120. In addition, operating system 140 includes one or more file systems 150 that manage files used in the operation of computer 108 and a process control subsystem 152 that manages processes executing on computer 108. Operating system 140 further includes a system call interface module 142 that provides an interface between the operating system 140 and one or more application modules 162.

In operation, one or more application modules and/or libraries executing on computer 108 make calls to the system call interface module 142 to execute one or more commands on the computer's processor. The system call interface module 142 invokes the services of the file system(s) 150 to manage the files required by the command(s) and the process control subsystem 152 to manage the process required by the command(s). The file system(s) 150 and the process control subsystem 152, in turn, invoke the services of the hardware interface module 154 to interface with the system hardware 120.

The particular embodiment of operating system 140 is not critical to the subject matter described herein. Operating system 140 may be embodied as a UNIX operating system or any derivative thereof (e.g., Linux, Solaris, etc.) or as a Windows® brand operating system.

In some embodiments, computer system 100 includes one or more modules to implement hybrid database query caching. In the embodiment depicted in FIG. 1, computer system 100 includes a database application 162, a hybrid caching module 164, an SQL compiler 166, and an SQL executor 168. These components may interface with, or be part of, a database management system (DBMS).

For example, database application 162 generates queries for one or more databases managed by computer system 100. Database application 162 may include a user interface which enables a user to generate a query. Alternatively, database application 162 may cooperate with one or more software modules to generate data query. In some embodiments, database application 162 may generate queries using Structured Query Language (SQL). However, any suitable query language can be utilized in addition to, or instead of, SQL, however.

Figure 2:
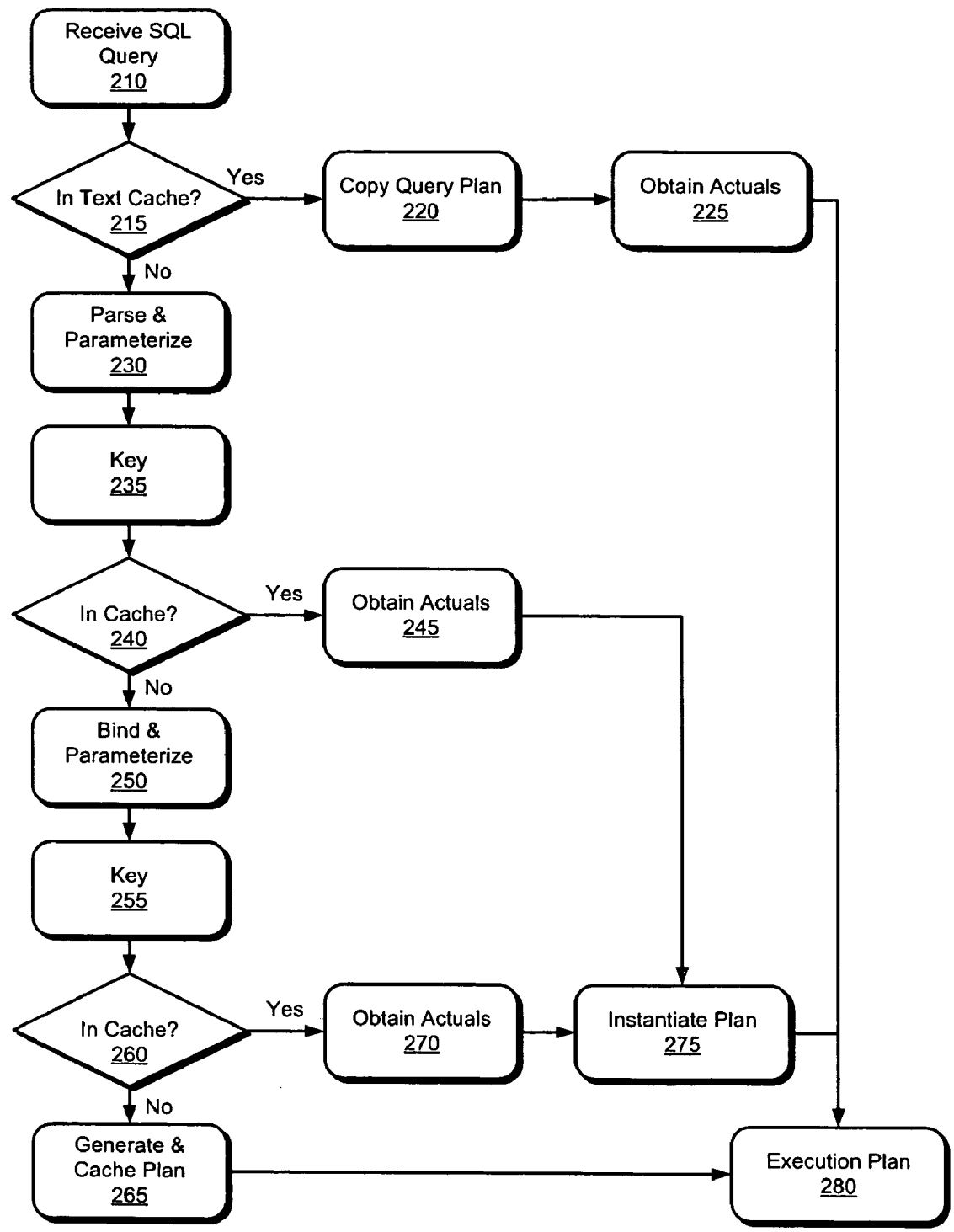
FIG. 2 is a flowchart illustrating operations that may be used to implement hybrid database query caching in accordance with one embodiment.

Queries generated by database application 162 are processed by hybrid caching module 164 in a manner described below with reference to FIG. 2 and are passed to SQL compiler 166. Compiler 166 processes the source code to produce object code and links the object code with one or more library routines to produce an executable program module. Multiple object codes may be combined into a single executable program module. The library routines linked into executable program module may include the private DBMS routines, which associate program module with the DBMS at run-time.

SQL compiler 166 can examine, parse, validate, and optimize SQL queries and produce a query plan for each SQL query. The query plan may be optimized for a particular database structure as it exists at the time the query plan is placed in the database. If the database structure changes later (for example, if an index is dropped or a column is added to a table), a query plan that references the changed structures may become invalid. To handle this situation, a DBMS may store a copy of the SQL statement from which a query plan was produced. The DBMS checks the timestamp of a query plan against the redefinition timestamps of all database objects used by the query plan. If any of these objects are modified by a Data Definition Language (DDL) statement, their redefinition timestamps will be more recent than the query plan's timestamp and the DBMS can perform similarity checks. The DBMS automatically marks query plans that fail similarity checking as invalid and recompiles that query (by invoking the services of SQL compiler 166) to get a valid query plan.

SQL executor 168 uses one or more query plans to execute DBMS instructions for one or more executable program modules. When an executable program module is invoked, a DBMS routine finds and loads a query plan for the program module(s). The SQL executor executes the corresponding query plan, and then returns control to the program module(s). Execution continues in this way, with the program module(s) and the DBMS cooperating to carry out the task defined by the original embedded SQL statements.

In some embodiments, system 100 may include a hybrid caching module 164 which cooperates with database application 162 and SQL compiler 166 to implement hybrid database query caching. FIG. 2 is a flowchart illustrating operations that may be used to implement hybrid database query caching in accordance with one embodiment of hybrid caching module 164. Referring to FIG. 2, at operation 210 hybrid caching module 164 receives an SQL query, e.g., from database application 162.

In one embodiment hybrid caching module 164 determines whether the SQL query received in operation 210 is stored in a memory module coupled to computer system 100 such as, e.g., a cache memory module. As described above, a DBMS may store executed queries in text cache memory. If, at operation 215, the SQL query is in text cache, then at operation 220 the query plan is copied from memory. At operation 225 the actuals from the SQL query received in operation 210 are incorporated into the execution plan 280.

By contrast, if at operation 215 the SQL query received at operation 210 cannot be found in text cache, then control passes to operation 230 and the SQL query is parsed and parameterized. For example, the SQL query may be analyzed and parsed on a clause-by-clause basis and segregated into constituent components. Parsing the query may include analyzing the syntax of the SQL query to ensure the syntax is correct. A parsed SQL query may be represented as an expression tree. Constant values such as, e.g., inventory identification numbers that represent differences that can be parameterized, are extracted into actuals.

The remaining elements of the query are treated as a key 235. Hybrid caching module 164 then uses the key 235 to search (operation 240) previously compiled template plans stored in a memory module such as, e.g., a cache. Template plans are execution plans that may have "holes" called formals representing that query's extracted parameters. If, at operation 240, a match is found, then the actuals received with the SQL query in operation 210 are obtained by extracting the actuals from operation 230 and are used to instantiate the matching template plan's formals (operation 275). The result is a complete execution plan 280.

If, at operation 240, a plan matching the key 235 is not located in memory, then the hybrid caching module binds and parameterizes the query. The remaining elements of the query are treated as a key 255. Hybrid caching module 164 then uses the key 255 to search (operation 260) previously compiled template plans stored in a memory module such as, e.g., a cache. If, at operation 260, a match is found, then the actuals received with the SQL query in operation 210 are obtained at operation 270 by extracting the actuals from operation 250 and are used to instantiate the matching template plan's formals (operation 275). The result is a complete execution plan 280.

Figure 3:
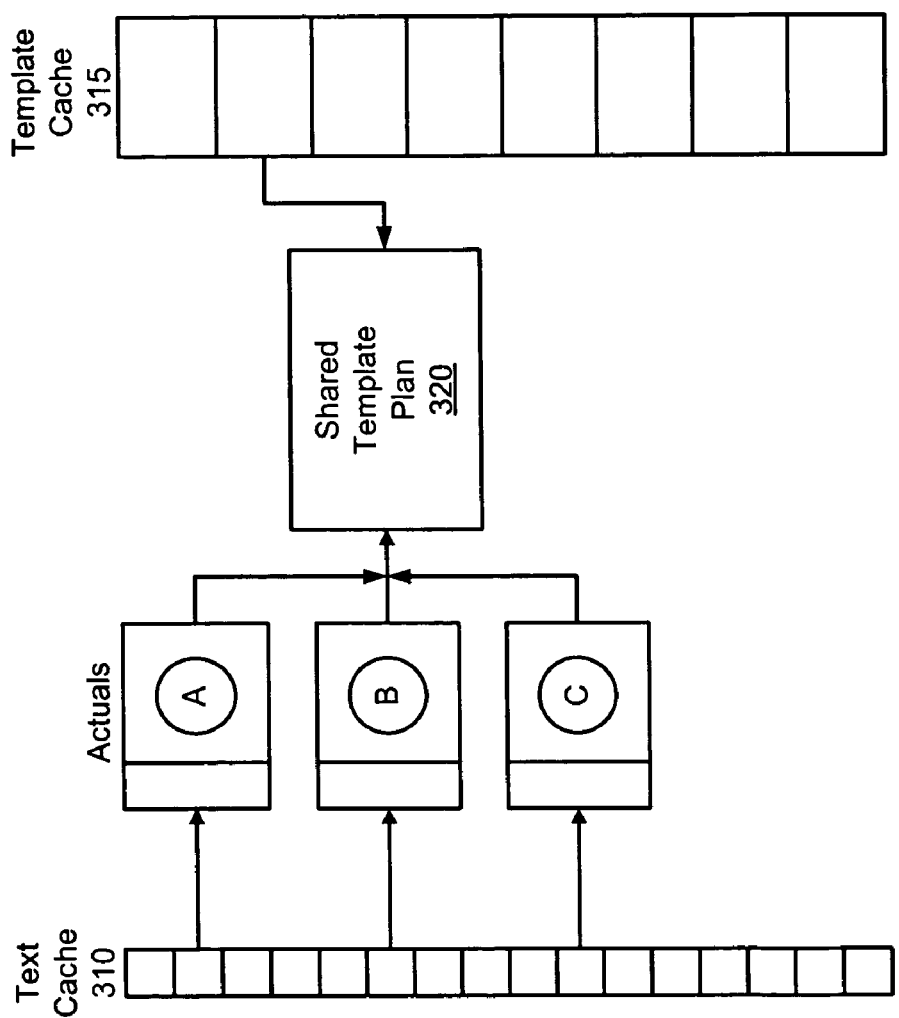
FIG. 3 is a schematic illustration a memory mapping arrangement that may be used to implement hybrid database query caching in accordance with one embodiment.

FIG. 3 is a schematic illustration a memory mapping arrangement that may be used to implement hybrid database query caching in accordance with one embodiment. Referring to FIG. 3, a DBMS may maintain a text cache 310 and template cache 315. Text cache 310 stores the actuals of text cache entries, while template cache 315 stores templates extracted from queries. The DBMS may combine actuals (e.g., A, B, C) in text cache 310 with a shared template plan 320 from template cache 315. This allows multiple queries to be cached with effectively only one cache entry. The actuals (e.g., A, B, C) in text cache 310 are typically much smaller than their shared template plan 320.

Figure 4:
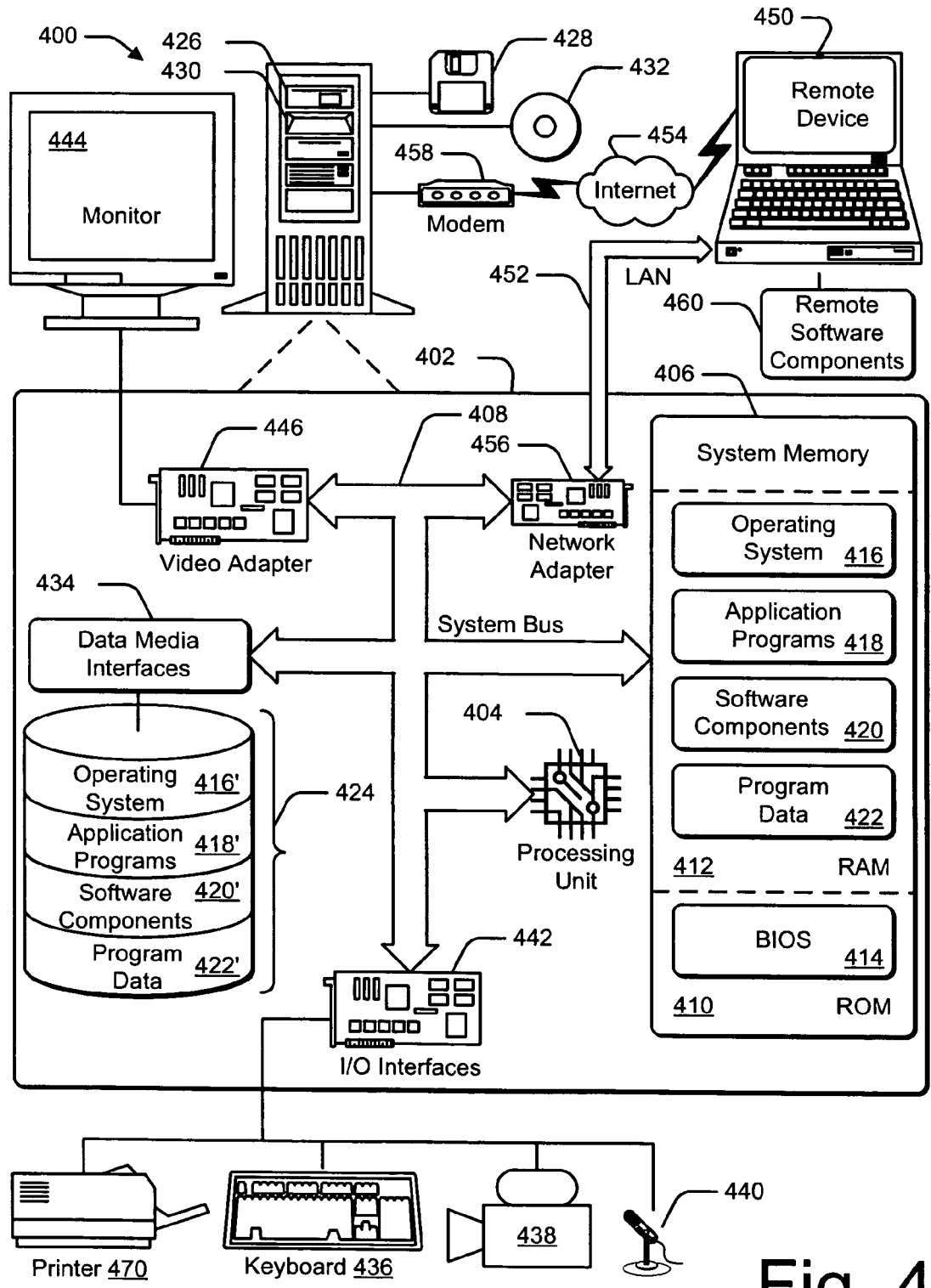
FIG. 4 is a schematic illustration of a computing environment that may be used to implement hybrid database query caching in accordance with one embodiment.

Embodiments discussed herein may be embodied in machine-executable instructions, which may in turn be utilized to cause a general-purpose or special-purpose processor, or logic circuits programmed with the instructions to perform the operations. Alternatively, the operations may be performed by a combination of hardware and software. Various components and functionality described herein may be implemented within one or more computers. FIG. 4 shows components of typical example of such a computer, referred by to reference numeral 400. The components shown in FIG. 4 are only examples, and are not intended to suggest any limitation as to the scope of the functionality of the invention; the invention is not necessarily dependent on the features shown in FIG. 4.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions, programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 4, the components of computer 400 may include, but are not limited to, a processing unit 404, a system memory 406, and a system bus 408 that couples various system components including the system memory 406 to the processing unit 404. The system bus 408 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as the Mezzanine bus.

Computer 400 typically includes a variety of computer-readable media. Computer-readable media can be any available media that can be accessed by computer 400 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 400. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network, fiber optic networks, or direct-wired connection and wireless media such as acoustic, RF, infrared and other wireless media. Combinations of any of the above should also be included within the scope of computer readable media.

The system memory 406 includes computer storage media in the form of volatile and/or nonvolatile memory such as read only memory (ROM) 410 and random access memory (RAM) 412. A basic input/output system 414 (BIOS), containing the basic routines that help to transfer information between elements within computer 400, such as during start-up, is typically stored in ROM 410. RAM 412 typically contains data and/or program modules that are immediately accessible to and/or presently being operated on by processing unit 404. By way of example, and not limitation, FIG. 4 illustrates operating system 416, application programs 418, other software components 420, and program data 422.

The computer 400 may also include other removable/non-removable, volatile/nonvolatile computer storage media. By way of example only, the computer system of FIG. 4 may include a hard disk drive 424 that reads from or writes to non-removable, nonvolatile magnetic media, a magnetic disk drive 426 that reads from or writes to a removable, nonvolatile magnetic disk 428, and an optical disk drive 430 that reads from or writes to a removable, nonvolatile optical disk 432 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 424 is typically connected to the system bus 408 through a non-removable memory interface such as data media interface 434, and magnetic disk drive 426 and optical disk drive 430 are typically connected to the system bus 408 by a removable memory interface.

The drives and their associated computer storage media discussed above and illustrated in FIG. 4 provide storage of computer-readable instructions, data structures, program modules, and other data for computer 400. In FIG. 4, for example, hard disk drive 424 is illustrated as storing operating system 416', application programs 418', software components 420', and program data 422'. Note that these components can either be the same as or different from operating system 416, application programs 418, software components 420, and program data 422. Operating system 416, application programs 418, other program modules 420, and program data 422 are given different numbers here to illustrate that, at a minimum, they are different copies. A user may enter commands and information into the computer 400 through input devices such as a keyboard 436 and pointing device 438, commonly referred to as a mouse, trackball, or touch pad. Other input devices (not shown) may include a microphone 440, joystick, game pad, satellite dish, scanner, or the like. These and other input devices are often connected to the processing unit 404 through an input/output (I/O) interface 442 that is coupled to the system bus, but may be connected by other interface and bus structures, such as a parallel port, game port, or a universal serial bus (USB). A monitor 444 or other type of display device is also connected to the system bus 406 via an interface, such as a video adapter 446. In addition to the monitor 444, computers may also include other peripheral output devices (e.g., speakers) and one or more printers 470, which may be connected through the I/O interface 442.

The computer may operate in a networked environment using logical connections to one or more remote computers, such as a remote computing device 450. The remote computing device 450 may be a personal computer, a server, a router, a network PC, a peer device or other common network node, and typically includes many or all of the elements described above relative to computer 400. The logical connections depicted in FIG. 4 include a local area network (LAN) 452 and a wide area network (WAN) 454. Although the WAN 454 shown in FIG. 4 is the Internet, the WAN 484 may also include other networks. Such networking environments are commonplace in offices, enterprise-wide computer networks, intranets, and the like.

When used in a LAN networking environment, the computer 400 is connected to the LAN 452 through a network interface or adapter 456. When used in a WAN networking environment, the computer 400 typically includes a modem 458 or other means for establishing communications over the Internet 454. The modem 458, which may be internal or external, may be connected to the system bus 408 via the I/O interface 442, or other appropriate mechanism. In a networked environment, program modules depicted relative to the computer 400, or portions thereof, may be stored in the remote computing device 450. By way of example, and not limitation, FIG. 4 illustrates remote application programs 460 as residing on remote computing device 450. It will be appreciated that the network connections shown are exemplary and other means of establishing a communications link between the computers may be used.

Moreover, some embodiments may be provided as computer program products, which may include a machine-readable or computer-readable medium having stored thereon instructions used to program a computer (or other electronic devices) to perform a process discussed herein. The machine-readable medium may include, but is not limited to, floppy diskettes, hard disk, optical disks, CD-ROMs, and magneto-optical disks, ROMs, RAMs, erasable programmable ROMs (EPROMs), electrically EPROMs (EEPROMs), magnetic or optical cards, flash memory, or other suitable types of media or computer-readable media suitable for storing electronic instructions and/or data. Moreover, data discussed herein may be stored in a single database, multiple databases, or otherwise in select forms (such as in a table).

Additionally, some embodiments discussed herein may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

What is claimed is:

1. A method, comprising:
receiving, in a hybrid caching module of a computer system executing a database application, a database query;
determining whether at least a portion of an existing execution plan stored in a memory module coupled to the hybrid caching module can be reused to implement the database query by:
searching a text cache of previous database queries for an identical query; and if an identical query is not found
searching a template cache of execution plans of previous queries for a similar query;
reusing an execution plan of the identical query as an execution plan for the database query when the identical query is found, and reusing a portion of an execution plan of the similar query as the execution plan for the database query when the identical query is not found and the similar query is found; and
generating a new execution plan for the database query when the memory module lacks an existing execution plan.

2. The method of claim 1, wherein generating a new execution plan for the database query when the memory module lacks an existing execution plan further comprises storing the execution plan in a memory module coupled to the hybrid caching module.

3. The method of claim 1, further comprising executing the execution plan.

4. A computer system, comprising:
one or more processors;
a memory module communicatively connected to the one or more processors and comprising logic instructions stored on a computer readable storage medium which, when executed on the one or more processors configure the one or more processors to:
receive, in a hybrid caching module, database query;
determine whether at least a portion of an existing execution plan stored in a memory module coupled to the hybrid caching module can be reused to implement the database query by causing the one or more processors to:
search a text cache of previous database queries in the memory module for an identical query; and if the identical query is not found
search a template cache of execution plans of previous queries in the memory module for a similar query;
reuse an execution plan of the identical query as an execution plan for the database query when the identical query is found, and reuse a portion of an execution plan of the similar query as the execution plan for the database query when the identical query is not found and the similar query is found; and
generate a new execution plan for the database query when the memory module lacks an existing execution plan.

5. The computer system of claim 4 wherein when the one or more processors reuse a portion of an execution plan, the logic instructions cause the one or more processors to modify a template execution plan of the similar query to be the execution elan for the database query.

6. The computer system of claim 4, further comprising logic instructions stored on a computer readable storage medium which, when executed on the one or more processors, configure the one or more processors to store the execution plan in a memory module coupled to the hybrid caching module.

7. The computer system of claim 4, further comprising logic instructions stored on a computer readable storage medium which, when executed on the one or more processors, configure the one or more processors to execute the execution plan.

8. A computer-readable storage medium comprising logic instructions which, when executed on a processor, configure a processor to:
receive, in a hybrid caching module, database query;
determine whether at least a portion of an existing execution plan stored in a memory module coupled to the hybrid caching module can be reused to implement the database query by causing the processor to:
search a text cache of previous database queries in the memory module for an identical query; and if an identical query is not found
search a template cache of execution plans of previous queries in the memory module for a similar query;
reuse an execution plan of the identical query for the database query when the identical query is found, and reuse a portion of an execution plan of the similar query when the identical query is not found and the similar query is found; and
generate a new execution plan for the database query when the memory module lacks an existing execution plan.

9. The computer-readable storage medium of claim 8 wherein when the processor reuses a portion of the execution clan of the similar query, the logic instructions further cause the processor to modify a template execution plan of the similar query to be the execution plan for the database query.

10. The computer-readable storage medium of claim 8, further comprising logic instructions which, when executed on the one or more processors, configure the one or more processors to store the execution plan in a memory module coupled to the hybrid caching module.

* * * * *

UNITED STATES PATENT AND TRADEMARK OFFICE
CERTIFICATE OF CORRECTION

PATENT NO. : 7,743,053 B2 Page 1 of 1
APPLICATION NO. : 11/581942
DATED : June 22, 2010
INVENTOR(S) : Awny K. Al-Omari et al.

It is certified that error appears in the above-identified patent and that said Letters Patent is hereby corrected as shown below:

In column 8, line 18, in Claim 5, delete "claim 4" and insert -- claim 4, --, therefor.

In column 8, line 22, in Claim 5, delete "elan" and insert -- plan --, therefor.

In column 8, line 54, in Claim 9, delete "'claim 8" and insert -- claim 8, --, therefor.

In column 8, line 56, in Claim 9, delete "clan" and insert -- plan -- therefor.

Signed and Sealed this

Thirtieth Day of November, 2010

David J. Kappos
*Director of the United States Patent and Trademark Office*